United States Patent [19]

Serrano

[11] 4,367,374
[45] Jan. 4, 1983

[54] MODEM TELEPHONE INTERFACE CIRCUIT

[75] Inventor: Arthur L. Serrano, Canoga Park, Calif.

[73] Assignee: Novation, Inc., Tarzana, Calif.

[21] Appl. No.: 234,699

[22] Filed: Feb. 17, 1981

[51] Int. Cl.³ .............................................. H04L 5/00
[52] U.S. Cl. .................................. 179/2 C; 179/2 DP
[58] Field of Search .................... 179/1 C, 1 PC, 2 C, 179/1 SW, 2 DP, 3, 4

[56] References Cited

U.S. PATENT DOCUMENTS

| | | |
|---|---|---|
| 3,517,137 | 6/1970 | Ribner .......................... 179/2 DP X |
| 3,524,935 | 8/1970 | Gonsewski et al. ......... 179/2 DP X |
| 3,647,993 | 3/1972 | Foulkes et al. .............. 179/2 DP X |
| 3,665,107 | 5/1972 | Kopec et al. ................ 179/2 DP X |
| 3,822,364 | 7/1974 | Lee ....................................... 179/2 C |
| 3,962,546 | 6/1976 | Hashimoto ...................... 179/2 DP |
| 4,009,342 | 2/1977 | Fahrenschon et al. ......... 179/2 DP |
| 4,160,122 | 7/1979 | Jacobson . | |

FOREIGN PATENT DOCUMENTS 935581 10/1973 Canada ............................ 179/2 DP
987261 3/1965 United Kingdom ............ 179/2 DP

*Primary Examiner*—A. D. Pellinen
*Assistant Examiner*—Keith E. George
*Attorney, Agent, or Firm*—Blakely, Sokoloff, Taylor & Zafman

[57] ABSTRACT

An interfacing circuit for directly coupling the handset of a telephone to a modem with provision for monitoring the data on the phone line is disclosed. The circuit may be readily connected to standard telephones. Four modes of operation are selectable by a pair of switches. The four modes of operation which may be utilized are as follows: normal phone operation, normal modem operation without the monitoring, normal modem operation with monitoring, and monitoring of data received only. In addition to allowing easy monitoring of data on the phone lines, the invention eliminates the need for a special phone to allow direct connection of a modem to a dial-up phone.

9 Claims, 2 Drawing Figures

MODEM TELEPHONE INTERFACE CIRCUIT

BACKGROUND OF THE INVENTION

1. Field of the Invention

The invention relates to the field of interfacing a modem to existing telephone circuitry.

2. Prior Art

In the field of data communications there is an increasing demand for attaching modems to existing telephone circuits. As a consequence of this demand there is the corresponding need for providing a modem-telephone interface which is reliable and easy to use.

One such interface commonly used utilizes a coupling from the handset of a telephone to a device which translates the sound signals emanating from the speaker in the handset into appropriate digital signals to be utilized by the modem. Additionally, the device translates the digital signals from the modem which are to be transmitted over the phone lines into an audio signal which is detected by the microphone in the handset. The device which performs this function is commonly referred to as an acoustic coupler. This accoustic coupler device is used by a terminal user dialing up a phone number known to be connected to an auto-answer modem, whereupon the auto-answer circuitry of this modem connects it (the modem at the receiving end of the call) to the telephone line. Upon hearing the carrier transmitted by this remote modem through the handset, the terminal user places the handset into the accoustic coupler device. A microphone in the accoustic coupler device detects the sound of the carrier from the remote modem through the speaker in the handset. The accoustic coupler then converts it into a digital signal which signals the local modem at the terminal user's site that a connection has been made. This local modem completes the circuit with the remote modem by sending its own carrier through the accoustic coupler and then over the phone lines to the remote modem. After this "hand shaking" procedure is completed by the modems, data communications between the two sites may begin. The reliability of this type of interface suffers as the signals coming over the telephone line are first converted to audio signals and then are converted back into digital signals by the acoustic coupling device.

A second type of interface for performing this function eliminates the need for an accoustic coupler by directly coupling a phone line to a modem. This is accomplished by a terminal user who upon hearing the carrier transmitted by the remote modem, engages a switch which breaks the connection between the telephone and handset. The set of wires which had been connected to the handset are instead coupled to a set of wires going into the local modem.

While this interface eliminates the need for an acoustic coupler, once the handset has been disconnected from the telephone circuit it is no longer possible to hear the carrier coming over the wire or to detect data signals which may be present on the wire. Additionally, a special phone having a switch mounted on it which is capable of performing this switching function must be provided.

It is often desirable to be able to listen to data signals through a speaker, while data communications are taking place, as a diagnostic tool. In the past, this function required the user to have a separate speaker which would be connected to the appropriate wire pair at a telephone company junction box as needed. The inconvenience and extra expense resulting are not desirable. Additionally, the recent blossoming of the home computer market has produced a multitude of users who would like to directly connect their modems to telephone circuitry thereby eliminating the accoustic coupling device. However, they do not wish to have a special phone adapted to perform this function.

The invention disclosed herein overcomes both of the foregoing problems.

SUMMARY OF THE INVENTION

A circuit is disclosed for providing a direct coupling from an ordinary dial-up telephone to a modem with a provision for easily monitoring the data signals which are being transmitted and received on the telephone line. The circuit to be described will not be concerned with the various isolation requirements of the telephone company, because these requirements do not affect the function of the disclosed invention.

Given the modular construction of telephones supplied by the telephone company or others, it is a simple matter to remove the handset from the body of the telephone. The handset may be plugged into a box containing the interface circuitry and a wire coming from this box may be plugged into the telephone body. This may be accomplished either by providing the appropriate plugs and jacks or if necessary a physical wire connection between the interface box and the telephone and the handset. Likewise, standard plugs and jacks may be utilized to connect the modem to the interface or if necessary, directly connecting the modem to the interface.

Once the box containing the interface circuitry has been installed as described above, it will operate as described below. A description of this method of operation will serve as a convenient summary of the invention.

There are two switches located on the box, one switch may be labeled DATA/TALK and the other switch may be labeled MONITOR/NORMAL. Normal phone operation occurs when the first switch is in the TALK position and the second switch is in the NORMAL position. A terminal user may dial a number known to be connected to an auto answer modem and upon making the connection and hearing the carrier through the speaker in the handset, he may place the first switch in the DATA position. This will connect the modem to the telephone circuitry and the handset will be disconnected from the telephone circuitry as in the prior art. By placing the second switch in the MONITOR position, the terminal user may listen to the data signals being transmitted over the telephone wires. Thus, by listening to the signals, a terminal user may determine whether or not there is a two way communication between the two modems. In the TALK mode it is also possible to disable the microphone in the handset by placing the switch in the MONITOR mode. This serves a "privacy" or "hold" function in which the remote party cannot hear conversations in the room with the local phone. This is a preferred method over that of covering the mouthpiece with a hand while placing the caller "on hold."

Thus this interface circuit provides for an easy connection to an ordinary dial up telephone and enables a terminal user to operate the interface in one of four modes by simply changing the position of two switches.

Another advantage of the interface circuit described herein is its capability of interfacing with a multiline business telephone system. This is not easily accomplished by a standard direct connect modem (i.e., one which connects directly to a telephone line) which would have to be provided with direct electrical connection to each wire in the multiline system.

DETAILED DESCRIPTION OF THE INVENTION

A circuit for interfacing a modem with a telephone handset wherein the transmitted and received signals passing over the telephone line may be monitored by a speaker in the handset is described. It is expressly understood that in the following discussion, circuitry necessary for providing the isolation which the telephone company may require can be added without affecting the performance of the described circuit. All references to the interface in the following discussion should be read to include the circuit itself and its associated switches, the enclosure containing the circuit and various connectors.

Figure 1:
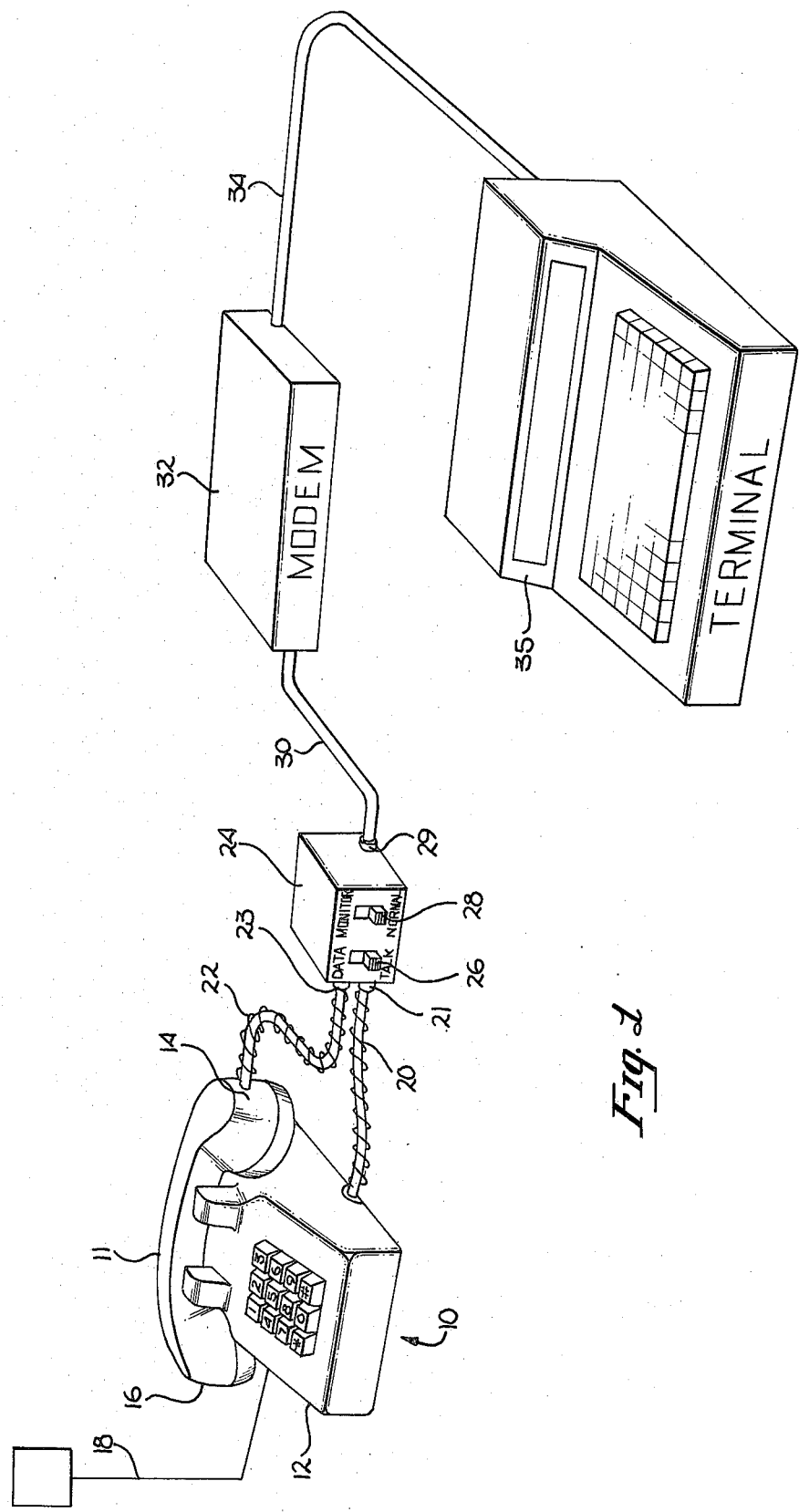
FIG. 1 is a general block diagram showing the interface and its connections to the other components necessary for data communications using telephone circuitry.

FIG. 1 is a pictorial representation of one configuration of the interface and other components necessary for data communications. While the interface 24 is shown separate from the modem 32 for purposes of functional emphasis, it is contemplated that the interface 24 and the device with which it interfaces (which may be the modem 32 or other device) would be sold and packaged as a single unit to comply with the requirements of regulatory agencies. An ordinary dial-up telephone is indicated generally by 10. Line 18 which consists of a pair of transmit wires and a pair of receive wires connects the telephone company circuitry to the telephone 10. The telephone itself is comprised of the telephone body 12 and the handset 11. The handset itself has a speaker 16 and a microphone 14. Line 20 which contains a pair of transmit wires and a pair of receive wires connects the phone body 12 to the interface 24 by connector 21. Line 22, which also has a pair of transmit wires and a pair of receive wires connects the interface 24 through connector 23 to the handset 11. Line 30, which has a transmit and receive pair of wires, connects the interface 24 by connector 29 to the modem 32. Line 34 which has at least a transmit wire and receive wire connects the modem to the terminal 35. The modem 32 and the terminal 35 are well known devices and will not be described here. It should be noted at this time that line 18 is connected to line 20 when the handset 11 is removed from the body of the telephone 12. The mechanisms for placing data onto line 18 are also well known and will not be described here.

In the preferred embodiment, connectors 21 and 23 will be of a construction compatible with the plugs and jacks used in the telephone industry for connecting the handset 11 to the telephone body 12. Other terminal connections are also possible such as screw type terminals or solder type terminals for example. Connector 29 may be compatible with the connectors for a particular modem manufacturer or may be any type of direct coupling desired.

Figure 2:
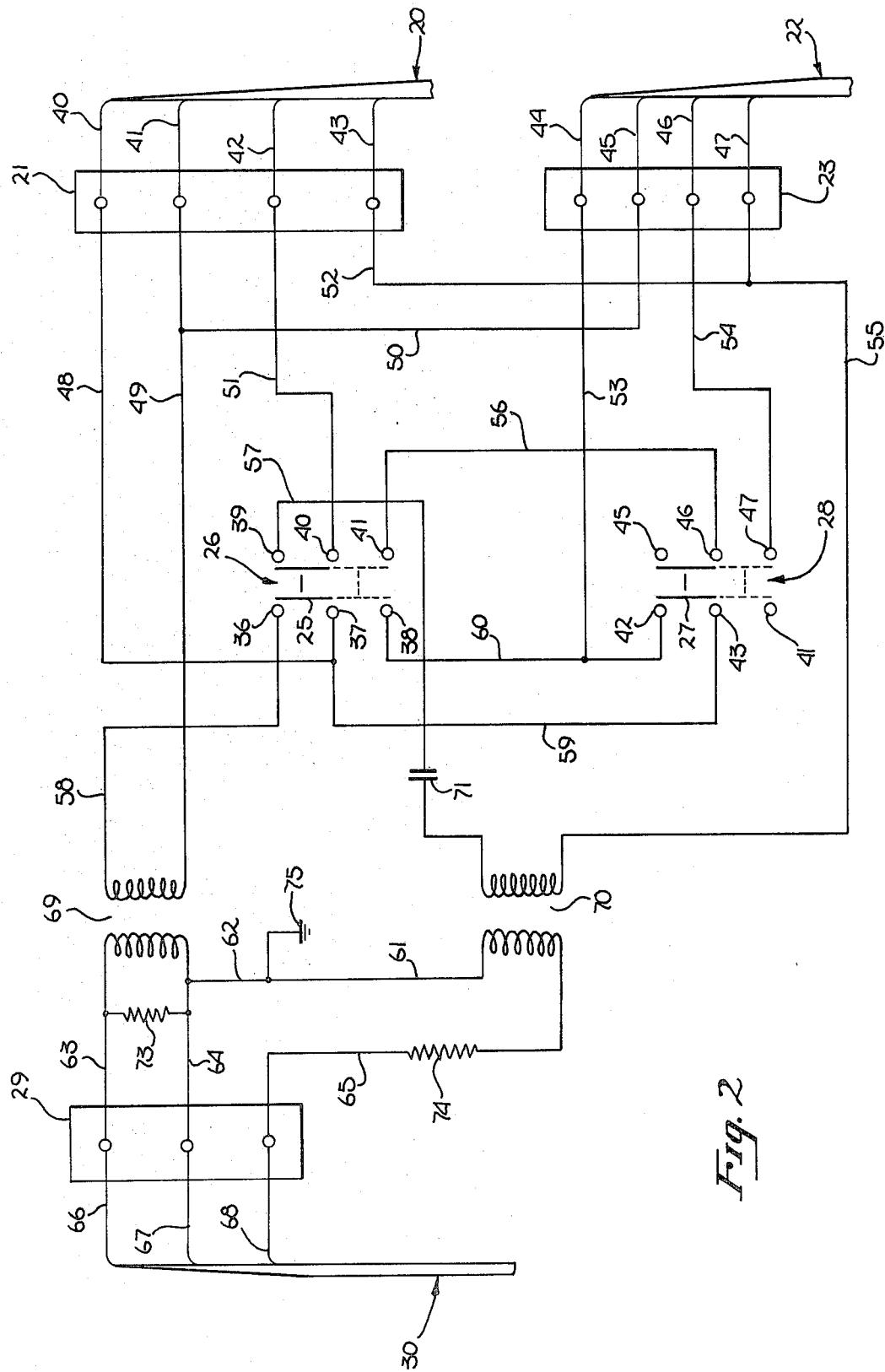
FIG. 2 is a schematic drawing of the interface circuitry.

The interface circuitry within the enclosure 24 is shown in FIG. 2. The receive pair of wires in line 20 are lines 40 and 41, and the transmit pair of wires in line 20 are lines 42 and 43. The connector 21, connects line 40 to line 48, line 41 to line 49, line 42 to line 51, and line 43 to line 52.

Line 22, has a pair of receive wires lines 44 and 45 and a pair of transmit wires lines 46 and 47. The receive pair, lines 44 and 45 may also be referred to as the speaker wires. The transmit pair, lines 46 and 47, may also be referred to as microphone wires. The foregoing nomenclature referring to the eventual destination of the two pair of wires.

Connector 23 connects line 44 to line 53, line 45 to line 50, line 46 to line 54, and line 47 to line 52. At this time it should be pointed out that prior to the interface circuitry being installed the following lines are directly coupled, line 47 to line 43, line 46 to line 42, line 45 to line 41 and line 44 to line 40. Thus, to eliminate unnecessary connectors, line 49 is connected to line 50 thereby coupling line 41 to line 45. Likewise, line 52 couples line 43 to line 47. This savings may be accomplished because only one wire out of a pair needs to be cut in order to disable the function performed by that pair of wires.

Switch 26 has six terminals numbered 36 through 41 and a slide member 25. The slide member 25 may be in either the position shown (DATA) or the position indicated by the shadow lines (TALK). When slide member 25 is in the position shown, terminal 36 is connected to terminal 37 and terminal 39 is connected to terminal 40. Thus in this position line 48 is connected to line 58 and line 51 is connected to line 57. This enables data which is being received to flow through wires 48 and 49 to isolation transformer 69 through wires 63 and 64 to connector 29 and lines 66 and 67 to line 30 and then to the modem 32. Line 63 is connected to line 64 through resistor 73 which is then connected to line 62 and to ground 75. A transformer such as 69 is provided for electrical isolation. Resistors, such as resistor 73, are provided for impedance matching to represent the impedance which would normally be provided by a microphone and speaker of the handset.

To complete the description of the circuit, while the slide member 25 is in the position indicated (DATA), line 51 is connected to line 57 and through capacitor 71 (which blocks DC voltage present at the microphone line) to transformer 70. Line 55 is always connected to transformer 70, thus the transmit pair of wires completes a loop. The data received from the modem 32 from line 30 to line 68 through connector 39 to line 65 through resistor 74 passes through transformer 70, line 61 always being connected to ground. As described above the transmit pair of wires and the receive pair of wires are connected to the modem and two way data communication may be performed. However, the speaker and microphone in the handset are disabled.

When slide member 25 is in the shadow position (TALK), lines 58 and 57 are disengaged, thereby effectively disconnecting the modem from the telephone. When slide member 25 is in the aforesaid position, terminal 37 is connected to terminal 38 and terminal 40 is connected to terminal 41. This position has the effect of connecting line 51 to terminal 46 through line 56, terminal 46 being part of switch 28. Additionally, terminal 37 is connected to terminal 38 thereby establishing a connection between line 48 and terminal 43 through line 59, terminal 43 being connected to switch 28. The function performed when switch 26 has slide member 25 in the shadow position can be described only in conjunction with the position of slide member 27 which is part of switch 28.

With slide member 27 in the position (MONITOR) indicated in FIG. 2 and slide member 25 in the shadow position the following connections are made. Line 51 is connected to line 56 which is connected to terminal 46 which is connected to terminal 45 which has no connection, therefore line 51 is not connected thereby disabling the transmit pair of wires within line 20. One of the receive pair of wires 40 is connected by line 48 to terminal 37, through line 59 to terminal 43 and to terminal 42 which is connected by line 60 to terminal 38. Thus, it is apparent that the speaker pair of wires 44 and 45 are connected when slide member 25 is in the shadow position (TALK) or slide member 27 is in the depicted position (MONITOR). With the switch 26 in the TALK position and switch 28 in the MONITOR position the data being received over lines 40 and 41 may be heard through the speaker in the handset, but there is no connection to the modem or to the microphone in the handset.

As has been previously described, when slide member 25 is in the position shown in FIG. 2 (DATA), both the transmit and receive side of the modem are connected to the phone circuit. The effect of having slide member 27 in the position depicted (MONITOR), connects the speaker in the handset to the telephone circuit, thus allowing the two way communications coming over the phone lines to be heard and monitored through the speaker.

When slide member 27 is in the shadow position (NORMAL) and slide member 25 is in the depicted position (DATA), the connections between terminals 42 and 43 and terminals 37 and 38 are broken. Thus line 53 terminates at terminal 42 and terminal 38 without any other connections, thereby removing the speaker from the circuit. The microphone is likewise removed because line 54 is connected to line 56 through terminals 46 and 47, however, line 56 terminates at terminal 41.

The final position yet to be described is when slide member 25 is in the shadow position (TALK) and slide member 27 is in the shadow position (NORMAL). This position connects line 51 through terminals 40 and 41 to line 56 through terminals 46 and 47 to line 54 thereby completing the microphone connection. Line 48 is connected to terminal 37 through terminal 38 and line 60 to line 53 thereby completing the speaker connection. As previously described, with slide member 25 in the shadow position (TALK) the modem is removed from the circuit. With only the speaker and the microphone connected, the telephone will operate in the normal manner.

The following table summarizes the elements (MODEM, SPEAKER, MICROPHONE) which are coupled to the appropriate telephone company receive/transmit wires when switches 26 and 28 are in each of the above described positions.

TABLE 1

|  |  | SWITCH 28 | |
| --- | --- | --- | --- |
|  |  | MONITOR | NORMAL |
| SWITCH 26 | DATA | MODEM, SPEAKER | MODEM |
|  | TALK | SPEAKER | MICROPHONE, SPEAKER |

Other embodiments of the disclosed invention include substituting for switch 26 and switch 28, which are otherwise known as doubled pole-double throw switches, other types of switches. For example, each of the terminal pairs 36–37, 37–38, 39–40, 40–41, 42–43, 43–44, 45–46, and 46–47 is for practical purposes a single pole-single throw switch. The two switches consisting of terminals 45–46 and terminals 43–44 are not necessary since there are no connections to them. Thus rather than two double pole-double throw switches as disclosed, six single pole-single throw switches may be utilized to perform this same function. Utilizing other combinations of these switches may allow other modes of operation in addition to the four described above, however these additional modes of operation are not likely to be useful to a terminal user and would only add complications to the proper positioning of the switches to perform a particular desired function.

Thus a circuit has been described which provides an easy connection to an ordinary dial-up telephone and which allows a convenient method to monitor data signals which are on a telephone line.

I claim:

1. A telephone handset-modem interface apparatus, said telephone handset having a speaker, a microphone, a receive wire and a transmit wire, said modem having a receive terminal and a transmit terminal, said apparatus comprising:
    (a) first connector means for coupling said apparatus to said handset;
    (b) second connector means for coupling said apparatus to said modem;
    (c) a first switch means having a first position for coupling said receive wire to said receive terminal, and a second position for coupling said receive wire to said speaker;
    (d) a second switch means having a first position for coupling said transmit wire to said transmit terminal, and a second position for coupling said transmit wire to a connection terminal;
    (e) a third switch means for coupling said receive wire to said speaker;
    (f) a fourth switch means for coupling said connection terminal to said microphone;
    whereby the positioning of said switches determines the selection of one of a plurality of operating modes.

2. The apparatus defined by claim 1 wherein said first connector means is a set of standard telephone company connectors.

3. The apparatus defined by claim 1 wherein said second connector means is a set of connectors utilized by a modem manufacturer.

4. The apparatus defined by claim 1 wherein said first switch means and said second switch means together comprise a double pole-double throw switch.

5. The apparatus defined by claim 1 wherein said third switch means and said fourth switch means together comprise a second double pole-double throw switch.

6. The apparatus defined by claim 5 wherein said connection terminal is a terminal on said second double pole-double throw switch.

7. The apparatus defined by claim 1 further comprising enclosure means for containing said apparatus.

8. An apparatus for connecting a standard telephone handset to a modem comprising:
    (a) first switch means for selectably coupling a receive pair of wires in said handset to said modem and a transmit pair of wires in said handset to said modem and coupling said receive pair of wires to a speaker in said handset and said transmit pair of wires to a connecting terminal;

(b) second switch means for selectably coupling said receive pair of wires to said speaker and said connecting terminal to a microphone in said handset.

9. The apparatus defined in claim 8 wherein said first switch means and said second switch means are each a double pole-double throw switch.

* * * * *